Jan. 3, 1939. A. L. V. C. DEBRIE 2,142,606
CINEMATOGRAPHIC APPARATUS
Filed Jan. 22, 1937
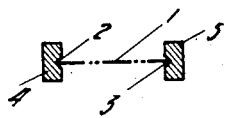
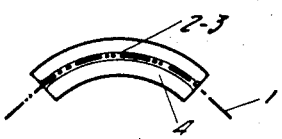
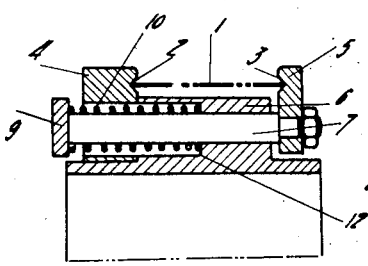
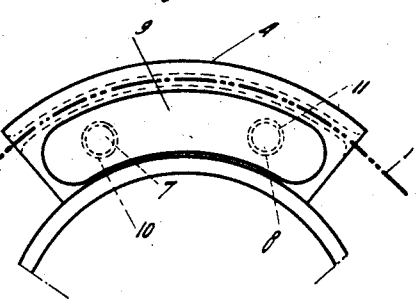
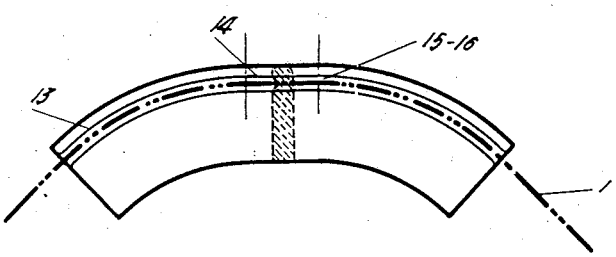

Patented Jan. 3, 1939

2,142,606

UNITED STATES PATENT OFFICE 2,142,606

CINEMATOGRAPHIC APPARATUS

André Léon Victor Clément Debrie, Paris, France

Application January 22, 1937, Serial No. 121,900
In the Netherlands February 10, 1936

3 Claims. (Cl. 271—2.6)

It is known that in cinematographic apparatuses, the film is guided inside a suitable channel, in particular in front of the picture gate, or the sound reading means etc.

It has already been proposed to form guiding channels of this kind wherein one of the sides is stationary while the other is movable and urges the film against the stationary side. This arrangement has for its drawback that it causes the film to become convex in the direction of its width by reason of the lateral thrust of the movable part generally submitted to the action of springs. To oppose the formation of this convexity, it is necessary to resort to a movable part or presser acting perpendicularly to the surface of the film. But the use of the arrangement is in fact very limited as the records and perforations etc. distributed throughout the width of the film do not allow a sufficiently wide bearing surface to be provided. On the other hand the presser shows the drawback of submitting the film to two pressures perpendicular to one another of which one which acts on the two edges of the film must be more considerable to the other.

It has also been proposed to use channels the cross-section of which is generally U-shaped and the sides of which diverge gradually in the upward direction. The film arranged between the sides is thus centered without being submitted to any lateral effort. It remains thus flat, but its position as to height in the channel varies, by reason of the different breadths it may have; consequently no adjustment to be performed with reference to the plane of the film, such as the focusing, is possible with such an arrangement.

Lastly certain guiding systems make use of a rectilinear channel the cross-section of each side of which is that of a V having a horizontal axis of symmetry, the spacing between the remotest points of these notches being invariable and slightly less wide than the width of the film. The latter is thus braked along both edges but it is of necessity convex in the direction of its width whereby the above disclosed drawback is again encountered.

My invention has for its object improvements in film guiding channels which allow the centering of the film to be obtained while retaining the flatness thereof breadthwise, the position of the film in height in the channel being maintained without it being necessary to resort to a bearing surface contacting with either face of the film.

According to my invention the channel which is incurved in the longitudinal direction of the film is constituted chiefly by two parts facing one another as V-shaped cross-sections having a horizontal axis of symmetry; these two parts are arranged symmetrically, one being stationary and the other being movable along the direction of the axes of symmetry of the V's of the cross-section and submitted to a lateral pressure. Each section is in contact with an edge of the film only through the apex of the V.

By reason of this arrangement I obtain together the complete suppression of any transverse convexity of the film, an exceedingly smooth sliding of said film and a constancy of its position in height which allows all adjustments to be performed under the same conditions.

In the appended drawing I have shown in Figs. 1 and 2 a cross sectional and an elevational diagrammatic view respectively of a guiding channel;

In Figs. 3 and 4 a cross-sectional and an elevational view respectively of a first form of execution of the invention, and in Fig. 5 an elevational view of a modification.

As apparent in Fig. 1, the film 1 is guided and centered solely along its edges between the notches 2 and 3 which each have the shape of a V with a horizontal axis of symmetry and are provided in two cheek plates 4 and 5, incurved in the direction of motion of the film, which have a tendency to move towards each other so as to hold the film between its edges. By reason of the curvature of the channel, the flatness of the film in the horizontal direction is ensured; on the other hand the film is held automatically at a constant height inside the channel because the edges of the film are always in engagement with the apex of the angle formed by each of the notches 2 and 3, the mobility of one cheek-plate with reference to the other ensuring this engagement whatever the width of the film may be.

In practice this arrangement may be obtained as shown in Figs. 3 and 4.

The cheek plate 4 with the notch or groove 2 is stationary and rigid with the central part 6 which is never in contact with the film. This central part serves for guiding two transverse rods 7 and 8 integral at one end with a plate 9 and connected through their other end with the movable cheek-plate 5 provided with the groove 3. Two springs 10, 11 bear on one hand against the bottom of two recesses such as 12 and on the other hand against the plate 9 so as to constantly urge the movable cheek-plate 5 towards the stationary cheek-plate 4.

This form of execution is used whenever it is possible to resort to an entirely curvilinear shape for the channel, which is the case for instance in sound reading.

In the form of execution illustrated in Fig. 5, the guiding channel 13, although curvilinear in its major part, has however a rectilinear part 14 in its medial portion. The film 1 is still held through its edges between the centering grooves 15 and 16 which have each here also the shape of a horizontal V. All the above disclosed advantages are to be found again here. The modification of Fig. 5 is used for instance for a projection gate or in all cases where it is necessary to have a flat surface for the film.

What I claim is:

1. In a cinematographic apparatus having a gate, means for guiding the film in front of the gate, comprising two plates stationary in the direction of advancement of the film, facing each other and provided each with an at least partly curvilinear groove having throughout substantially the whole length of the guiding means a V-shaped cross-section opening towards the corresponding groove of the other plate, the axes of symmetry of corresponding V-shaped cross-sections being in alinement, the film being adapted to pass in front of the gate through the guiding means with its surface engaging solely the plates and said engagement being performed solely through the abutment of the film edges against the remote edge lines of the corresponding V-shaped grooves, two elongated bolts rigidly secured to one of the plates to either side of the gate and directed perpendicularly to the direction of advance of the film and parallel to the plane thereof and yielding means for securing the other plate to said bolts.

2. In a cinematographic projector a device for guiding a film in front of the gate along an arcuate path comprising two complementary plates having V-shaped grooves therein facing one another and said grooves extending curvilinearly throughout substantially the entire length of said gate and means for yieldingly moving said plates towards one another in accordance with the width of the film whose edges are retained in the grooves of said plates whereby a registration of said film is secured throughout the extent of said gate.

3. In a cinematographic projector, a device for guiding a film in front of the gate along an arcuate path comprising two complementary plates having V-shaped grooves therein facing one another and said grooves extending curvilinearly throughout substantially the entire length of said gate, one of said plates being fixedly mounted, the other plate being mounted so as to be movable toward and away from said fixed plate, bolts fixed to said movable plate and means coacting with said bolts urging said movable plate towards said fixed plate whereby a constant registration of the film is secured throughout said gate.

ANDRÉ LÉON VICTOR
CLÉMENT DEBRIE.

DISCLAIMER 2,142,606.—*André Léon Victor Clément Debrie*, Paris, France. CINEMATOGRAPHIC APPARATUS. Patent dated January 3, 1939. Disclaimer filed February 6, 1941, by the inventor.

Hereby disclaims claim 2 of said patent.

[*Official Gazette March 4, 1941.*]